United States Patent [19]
Johanndeiter et al.

[11] Patent Number: 4,800,428
[45] Date of Patent: Jan. 24, 1989

[54] CIRCUIT ARRANGEMENT FOR A TELEVISION RECEIVER COMPRISING A VIDEO TEXT DECODER

[75] Inventors: Martin H. Johanndeiter; Detlef W. K. Oldach, both of Hamburg, Fed. Rep. of Germany

[73] Assignee: U.S. Philips Corporation, New York, N.Y.

[21] Appl. No.: 48,196

[22] Filed: May 11, 1987

[30] Foreign Application Priority Data

May 22, 1986 [DE] Fed. Rep. of Germany ....... 3617251

[51] Int. Cl.⁴ ...................... H04N 7/087; H04N 9/74; H04N 5/262
[52] U.S. Cl. ..................................... 358/142; 358/22; 358/147; 358/183
[58] Field of Search ................. 358/22, 142, 146, 147, 358/181, 183

[56] References Cited

U.S. PATENT DOCUMENTS 4,388,639  6/1983  Cox et al. .......................... 358/147
4,393,404  7/1983  Cox et al. .......................... 358/147

Primary Examiner—James J. Groody
Assistant Examiner—Michael D. Parker
Attorney, Agent, or Firm—Gregory P. Gadson

[57] ABSTRACT

A circuit arrangement for a television receiver including a video text decoder (30), producing signals from the video text data from which control signals for a picture display device can be derived. The circuit arrangement further including a television signal decoder (1), deriving from the television signal via a low-pass filter arrangement (15) the luminance signal which can be taken from the luminance signal output (18). The low-pass filter arrangement (15) has a first attenuation characteristic for suppressing the chrominance signal and a second attenuation characteristic for allowing all video text data to pass. The second attenuation characteristic of the low-pass filter arrangement (15) is used during the period of time in which the video text data occur. The input of the video text decoder (30) is coupled to the luminance signal output (18) of the television signal decoder (1).

12 Claims, 3 Drawing Sheets

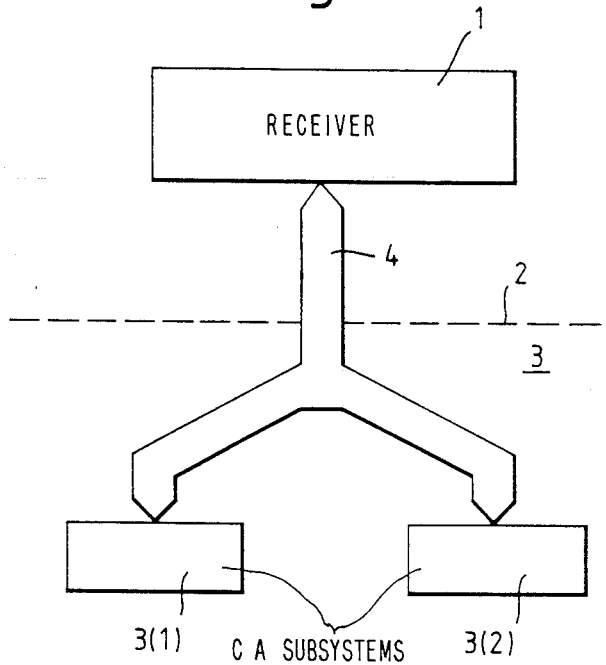
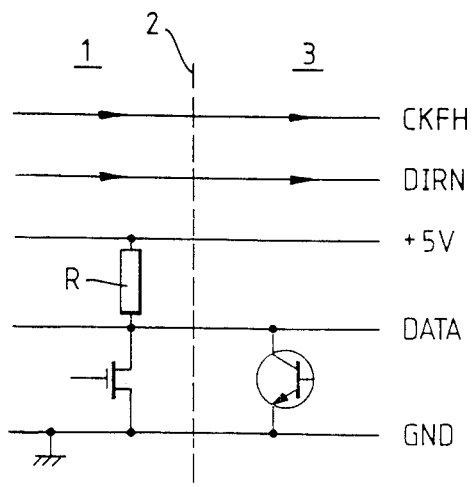

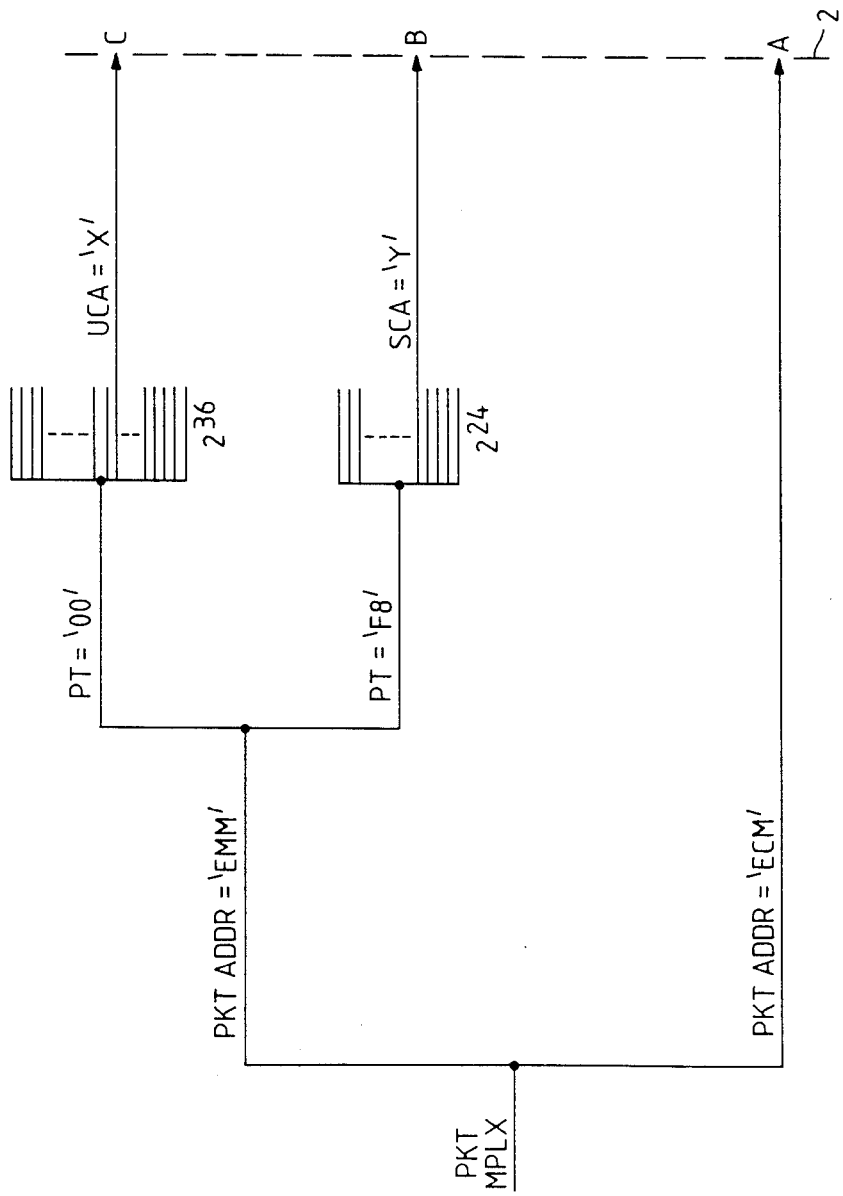

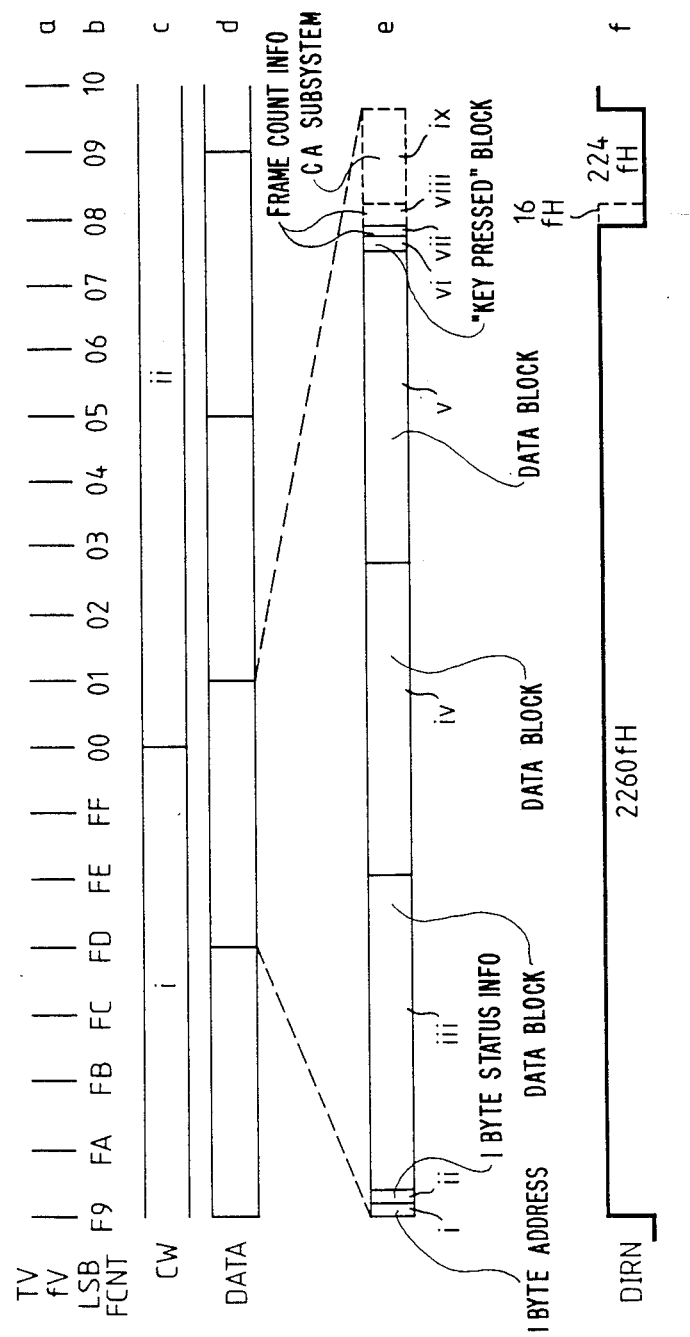

CIRCUIT ARRANGEMENT FOR A TELEVISION RECEIVER COMPRISING A VIDEO TEXT DECODER

BACKGROUND OF THE INVENTION

The invention relates to a circuit arrangement for a television receiver comprising a television signal decoder, this decoder deriving from the television signal applied to its input the luminance signal supplied by a luminance signal output via a low-pass filter arrangement for suppressing the chrominance signal, and comprising a video text decoder producing signals from the video text data from which driving signals for a picture display device can be derived.

Such a circuit arrangement is disclosed in the Valvo publication "Technische Informationen für die Industrie 80 04 07" entitled "Videotext und Bildschirmtext mit den LSI-Schaltungen SAA 5020, SAA 5030, SAA 5041 und SAA 5051". In this publication the television signal is applied to the video text decoder and the television signal decoder for deriving signals from which driving signals for the picture tube can be derived.

The video text data are transferred in the television signal during the vertical blanking intervals of the television picture in the lines 17, 18 and 330, 331. By means of the video text decoder in the television receiver the video text information is taken from the television signal, processed and displayed on the screen of the picture tube by means of alphanumeric and graphical symbols. The video text information is suitable for transmitting messages and subtitling, for example.

Practice has shown that there is an unacceptable shift between the inserted video text (picture subtitling) and the picture itself when the television signal decoder is designed as a digital processor. The television picture and the subtitling do not synchronize. The shift should then be compensated for by delay elements.

SUMMARY OF THE INVENTION

It is an object of the invention to provide a circuit arrangement of the type mentioned in the preamble so that a shift between the television picture and the subtitling is visible neither in an analogue nor in a digital implementation of the television signal decoder.

In accordance with the invention, the object is accomplished in that the input of the video test decoder is coupled to the luminance signal output, in that the low-pass filter arrangement has a first attenuation characteristic to suppress the chrominance signal and a second attenuation characteristic to allow all video text data to pass, in that the attenuation characteristic of the low-pass filter arrangement is changed-over by means of a change-over signal derived from the television signal by a change-over device so that the second attenuation characteristic of the low-pass filter arrangement is switched on at least during the periods of time in which the video text data occur.

In the circuit arrangement according to the invention the television signal is not directly applied to the video test decoder, but the luminance signal derived from the television signal in the television signal decoder which does not contain any part of the chrominance signal. Since in most cases a low-pass filter having a cut-off frequency of approximately 3 MHz is used for suppressing the chrominance signal, a low-pass filter having a cut-off frequency of approximately 3.5 MHz should be used at least during the periods of time in which the video text information is shown, so that the video text information can be received without being garbled, as with video text the maximum data rate is 6.9375 Mbit/s, resulting in the highest transmission frequency of 3.496 MHz.

According to the invention, the low-pass filter arrangement has two attenuation characteristics. The first attenuation characteristic is designed such that the chrominance signal is suppressed and the second characteristic is designed such that all video text data reach the video text decoder without being garbled. The low-pass filter arrangement can include, for example, a first low-pass filter with the first attenuation characteristic to suppress the chrominance signal and a second low-pass filter with the second attenuation characteristic to allow all video text data to pass. By means of a change-over switch the television signal is supplied to either one or the other low-pass filter. The low-pass filter arrangement can likewise include a plurality of switches, forming connections between the various elements of the arrangement. By controlling these switches either the first or the second attenuation characteristic can be used.

The change-over signal for the low-pass filter arrangement is derived from the television signal by means of a change-over device. For example, the color burst or the synchronizing pulses (horizontal synchronizing pulses or vertical synchronizing pulses) are suitable for this purpose.

As the picture display device does not show a luminance signal during the periods of time in which the vertical synchronizing pulse occurs, the change-over signal can be derived from this vertical synchronizing pulse. Such television signal decoders producing the color difference signals, the luminance signal and the television synchronizing pulses are known with the exception of the switchable low-pass filter arrangement and are obtainable as an integrated circuit.

The video text decoder supplies signals from which on the one hand control signals are formed for the picture display device and on the other a blanking signal for blanking the whole television picture or parts thereof. (for example for sub-titling purposes). These control signals for the picture display device are produced in a combining stage, receiving the output signals from the television signal decoder and the video text decoder.

The circuit arrangement in accordance with the invention can particularly be used to advantage when the television signal decoder is designed as a digital processor processing a television signal converted by means of an analog-to-digital converter which signal is available as a sequence of amplitude-discrete sampling values having a clock signal determined sampling rate and continuously supplying from its outputs a signal converted by a digital-to-analog converter. In this configuration the low-pass filter can be designed such that the multiplier stages wherein a multiplication by coefficients is effected are connected to change-over switches switching between two coefficient memories. The attenuation characteristic of the low-pass filter arrangement is continuously determined by means of the coefficients.

BRIEF DESCRIPTION OF THE DRAWING

The sole drawing FIGURE shows an embodiment of the circuit arrangement in accordance with the invention.

DETAILED DESCRIPTION OF THE INVENTION

The invention will now further be described with reference to the accompanying drawing.

In the only FIGURE of the drawing a television signal (CVBS-signal) is applied to an input 2 of a television signal decoder 1. The input 2 of the television signal decoder 1 likewise forms the input of an analog-to-digital converter 3. The output signal at an output 4 of the analog-to-digital converter 3 is available as a sequence of binary encoded sampling values and has, for example, a resolution of 7 bits. The sampling values occur at a repetition frequency, the sampling rate of, for example, 13.5 MHz.

The output 4 of the analog-to-digital converter 3 is connected to a band-pass filter 6 having an intermediate-frequency of 4.43 MHz and essentially allowing the chrominance signal to pass. The output signal of the band-pass filter 6 is applied to a chrominance signal processing stage 7 producing the two color difference signals U and V. The color difference signal U is taken from an output 8 of the chrominance signal processing stage 7 and converted into an analog signal in a digital-to-analog converter 10. The other color difference signal V is supplied to a digital-to-analog converter 11 via an output 9 of the chrominance signal processing stage 7. The analog color difference signal V is available at an output 12 of the digital-to-analog converter 11, which likewise forms an output of the television signal decoder 1, and the color difference signal U is available at an output 13, which likewise forms the output of the digital-to-analog converter 10.

The digitized television signal converted in the analog-to-digital converter 3 is further applied to a low-pass filter arrangement 15, having two attenuation characteristics, which can be switched on alternatively. The first attenuation characteristic is designed such that it suppresses the chrominance signal and has a cut-off frequency at, for example, 3 MHz. The second attenuation characteristic should be designed such that it allows at least all video text data to pass and has a cut-off frequency at, for example, 3.5 MHz. Such a switchable low-pass filter arrangement can be realized with two low-pass filters having different attenuation characteristics or with one filter to the multipliers of which coefficients are applied which are designed for the respective attenuation characteristic. To a multiplying input a multiplier can be connected, for example, having two coefficient memories at its inputs, which memories are optionally connectable to the multiplying input. The output signal of the low-pass filter arrangement 15 is applied to a luminance signal processing stage 16, whose output is connected to a digital-to-analog converter 17. An output 18 of the digital-to-analog converter 17, supplying the luminance signal Y, likewise forms an output of the television signal decoder 1. It should be observed that the luminance signal still contains the blanking pulses and the synchronizing pulses.

The output 4 of the analog-to-digital converter 3 is further connected to a synchronizing signal separating stage 20, deriving the synchronizing pulses from the television signal. The output signal of stage 20 is applied to a synchronizing pulse processing stage 21, producing the horizontal synchronizing pulses HS and the vertical synchronizing pulses VS which are available at outputs 22 and 23, respectively, of the television signal decoder 1.

A clock signal, which is not shown in the drawing, is constantly applied to the individual digital components, the digital-to-analog converters and the analog-to-digital converter 3. The television signal decoder 1 shown here is known per se, with the exception of the switchable low-pass filter arrangement 15 and is usually realized as an integrated circuit.

The output 23 of the television signal decoder 1 from which the vertical synchronizing pulses can be taken, is connected to a change-over arrangement 25 producing the change-over signal for the low-pass filter arrangement 15. The change-over signal causes a change-over from the first to the second attenuation characteristic in the low-pass filter arrangement 15. The second attenuation characteristic is present at least during the period of time in which the video text data are shown, that is to say during the lines 17 and 18 and the lines 330 and 331. The change-over arrangement 25 can for example, comprise counters, counting clock signal pulses produced by a clock signal generator. The frequency of the clock signal is much higher than the frequency of the vertical synchronizing pulse. By means of the counters the instant is determined at which the aforementioned lines of video text occur.

The output 18 of the television signal decoder 1 is connected to a video test decoder 30 which produces one blanking signal A and three color singals R, G and B at its outputs. The output signals of the video text decoder 30 are applied to a combining stage 31, which likewise receives the two color difference signals U and V and the luminance signal Y from the television signal decoder 1. The combining stage 31 produces suitable driving signals R, G and B for a picture display device (for example a picture tube). The blanking signal A is used for blanking the television picture formed by the signals from the television signal decoder 1, i.e., on the picture tube either the normal television picture will appear or only the video text information or the subitled television picture.

The circuit arrangement in accordance with the invention achieves that also when using a digital television signal decoder 1 the time-assignment of the television picture and video text information is guaranteed. The video text decoder 30 slightly delays the video text information with respect to the picture signal. But this delay cannot be perceived by the viewer, i.e., the video text information and the television picture are synchronized.

We claim:

1. A circuit arrangement for a television receiver comprising a television signal decoder, said television signal decoder deriving from a television signal applied to its input a luminance signal supplied by a luminance signal output via a low-pass filter arrangement for suppressing a chrominance signal, and comprising a video test decoder, producing signals from video text data from which driving signals for a picture display device can be derived, characterized in that the input of the video text decoder is coupled to the luminance signal output, in that the low-pass filter arrangement has a first attenuation characteristic to suppress the chrominance signal and a second attenuation characteristic to allow all video text data to pass in that the attenuation characteristic of the low-pass filter arrangement is changed over by means of a change-over signal derived from the television signal by a change-over device so that the second attenuation characteristic of the low-pass filter arrangement is switched on at least during the periods of time in which the video text data occur.

2. A circuit arrangement as claimed in claim 1, characterized in that the change-over device derives the change-over signal from synchronizing pulses.

3. A circuit arrangement as claimed in claim 2, characterized in that the change-over device derives the change-over signal from vertical synchronizing pulses.

4. A circuit arrangement as claimed in claim 1, characterized in that a combining stage receives the output signals from the television signal decoder and the video text decoder to produce control signals for the picture display device.

5. A circuit arrangement as claimed in claim 1, characterized in that the television signal decoder is designed as a digital processor, processing a television signal converted by means of an analog-to-digital converter which signal is available as a sequence of amplitude-discrete sampling values having a clock signal determined sampling rate and continuously supplying from its outputs a signal converted by a digital-to-analog converter.

6. A circuit arrangement as claimed in claim 2, characterized in that a combining stage receives the output signals from the television signal decoder and the video text decoder to produce control signals for the picture display device.

7. A circuit arrangement as claimed in claim 3, characterized in that a combining stage receives the output signals from the television signal decoder and the video text decoder to produce control signals for the picture display device.

8. A circuit arrangement as claimed in claim 2, characterized in that the television signal decoder is designed as a digital processor, processing a television signal converted by means of an analog-to-digital converter which signal is available as a sequence of amplitude-discrete sampling values having a clock signal determined sampling rate and continuously supplying from its outputs a signal converted by a digital-to-analog converter.

9. A circuit arrangement as claimed in claim 3, characterized in that the television signal decoder is designed as a digital processor, processing a television signal converted by means of an analog-to-digital converter which signal is available as a sequence of amplitude-discrete sampling values having a clock signal determined sampling rate and continuously supplying from its outputs a signal converted by a digital-to-analog converter.

10. A circuit arrangement as claimed in claim 4, characterized in that the television signal decoder is designed as a digital processor, processing a television signal converted by means of an analog-to-digital converter which signal is available as a sequence of amplitude-discrete sampling values having a clock signal determined sampling rate and continuously supplying from its outputs a signal converted by a digital-to-analog converter.

11. A circuit arrangement as claimed in claim 6, characterized in that the television signal decoder is designed as a digital processor, processing a television signal converted by means of an analog-to-digital converter which signal is available as a sequence of amplitude-discrete sampling values having a clock signal determined sampling rate and continuously supplying from its outputs a signal converted by a digital-to-analog converter.

12. A circuit arrangement as claimed in claim 7, characterized in that the television signal decoder is designed as a digital processor, processing a television signal converted by means of an analog-to-digital converter which signal is available as a sequence of amplitude-discrete sampling values having a clock signal determined sampling rate and continuously supplying from its outputs a signal converted by a digital-to-analog converter.

* * * * *